July 6, 1948.   R. A. ROSENBLUM   2,444,677
FLOW CONTROL DEVICE
Filed Dec. 14, 1946
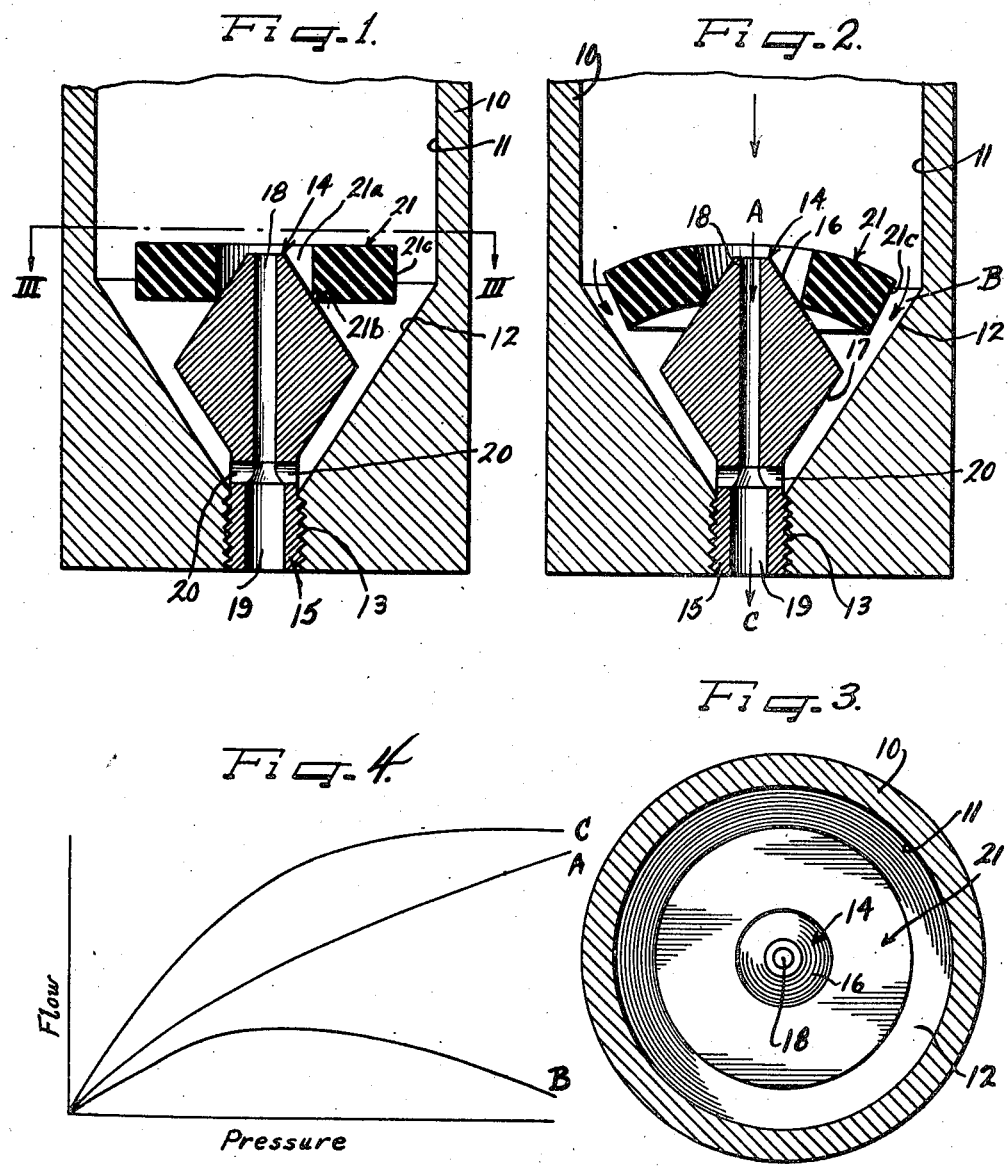
Inventor
ROBERT A. ROSENBLUM Patented July 6, 1948

2,444,677

UNITED STATES PATENT OFFICE 2,444,677

FLOW CONTROL DEVICE

Robert A. Rosenblum, Chicago, Ill., assignor to The Dole Valve Company, Chicago, Ill., a corporation of Illinois Application December 14, 1946, Serial No. 716,245

7 Claims. (Cl. 138—45)

This invention relates to fluid flow control devices having an elastic ring receiving fluid therethrough to supply a fixed orifice and receiving fluid therearound to vary the rate of fluid flow in accordance with pressure changes on the fluid.

Specifically, the invention deals with a flow control device including a casing with a tapered flow passage and an orificed insert member adjustably supported in said casing and carrying an elastic ring around the orifice thereof to coact with the tapered passage for creating another orifice which is both adjustable and automatically compensating for maintaining a desired combined discharge rate for the orifices.

According to this invention, a housing or casing is provided with a tapered passage converging to an internally threaded port. An insert member has a hollow shank threaded in this port and a head disposed concentrically in the tapered passage in spaced relation therefrom. The head preferably diverges to a major diameter intermediate the ends of the tapered passage and then converges to a hollow shank. An axial passage through the insert member provides a fixed orifice for feeding the hollow shank.

An elastic ring such as a rubber ring is seated around the diverging portion of the insert member to surround the fixed orifice. This rubber ring projects outward from the insert member into spaced relation with the tapered casing wall to coact therewith for forming a second or compensating orifice. Fluid flowing through this second orifice is fed through ports into the hollow shank. Threaded adjustments of the insert member in the casing can vary the initial spacing between the rubber ring and the tapered wall, thereby regulating the size of the compensating orifice.

Fluid flowing through the casing must flow through the fixed orifice direct to the hollow shank, or through the compensating orifice and ports into the hollow shank before it can be discharged from the casing. However, the rubber ring will deflect downstream in accordance with the pressure of the fluid to vary the capacity of the compensating orifice. Since the flow rate through the fixed orifice will rise as pressure of the fluid increases, and since the rubber washer will deflect as fluid pressure increases for decreasing the flow rate of the compensating orifice, the control device of this invention can be arranged to yield constant flow rates irrespective of changes in pressure.

The divided flow through and around the rubber washer is desirable since the washer tends to over-compensate by deflection under increasing pressures resulting in decreased flow capacity. The fixed flow capacity of the fixed orifice in the insert member eliminates the heretofore-encountered over-compensating control.

It is, then, an object of the invention to provide a fluid flow control device embodying an elastic washer or ring receiving fluid through its aperture and around its periphery.

A further object of the invention is to provide a fluid control device with a fixed orifice and an adjustable orifice controlled by an elastic member in such a manner that the combined discharge from the two orifices remains constant over a wide range of pressure conditions.

A still further object of the invention is to provide a fluid flow control device wherein an insert member is adjustable in the casing and carries a rubber washer in adjustably spaced relation to the casing whereby the initial setting of the washer can be easily adjusted.

Another object of the invention is to provide a flow control device including a casing with a tapered passage and an insert member adjustably threaded in the casing and having a head carrying an elastic washer to partially span the tapered passage for controlling flow therethrough in accordance with pressure exerted thereon.

Other and further objects of the invention will be apparent to those skilled in the art from the following detailed description of the annexed sheet of drawings which, by way of a preferred example only, illustrates one embodiment of the invention.

On the drawings:

Figure 1 is a fragmentary vertical cross-sectional view of a flow control device according to this invention illustrating the initial position of the rubber washer.

Figure 2 is a view similar to Figure 1 but illustrating the position assumed by the rubber washer when subjected to pressure.

Figure 3 is a transverse cross-sectional view taken along the line III—III of Figure 1.

Figure 4 is a diagram illustrating flow conditions obtained with the control device of this invention as compared with flow conditions obtained in a fixed orifice alone, and in a rubber ring-controlled orifice alone.

As shown on the drawings:

A casing or housing 10, best shown in Figures 1 and 2, has a cylindrical passage 11 accommodating flow of fluid. The passage 11 extends to a tapered passage 12 which converges to an internally threaded discharge port 13 in the end wall of the casing. An insert member 14 has an externally threaded shank 15 adjustably threaded in the port 13. The member 14 has a head portion projecting from the shank into the tapered passage 12. This head portion includes a diverging frusto-conical end 16 in the upper portion of the tapered passage 12, and a converging frusto-conical part 17 in the lower portion of the passageway 12. The portions 16 and 17 are spaced concentrically from the wall of the passage 12 and have an axial bore 18 therethrough. This bore 18 extends to an enlarged passageway 19 in the shank 15. Lateral ports 20 in the shank connect the bottom of the passage 12 with the upper end of the passage 19.

A rubber washer 21 is carried on the end portion 16 of the insert member 14 and has its central aperture 21a surrounding the upper end of the portion 16. As shown, the washer 21 rests on the end 16 at the rim edge 21b around the bottom of the aperture 21a and projects radially outward from the insert to the outer circumference 21c which is spaced inwardly from the entrance mouth of the tapered passage 12 of the casing 10. Since the washer 21 has substantially ring contact with the portion 16 of the insert, it can readily deflect under the influence of pressure in the casing. The deflection of the washer varies the space between the periphery of the washer and the tapered wall of the passage 12. As shown in Figure 2, fluid flowing through the casing 10 in the direction indicated by the arrow acts on the top face of the washer 21 and deflects the unsupported outer portion of the washer. Some of the fluid will flow as indicated at A through the axial passage 18 of the insert member 14. Some fluid will flow around the washer 21 through the annular orifice indicated at B between the periphery 21c of the washer and the adjoining tapered wall of the passageway 12. The stream of fluid from the orifice B merges with the stream of fluid through the passageway A at the ports 20 to combine and form a discharge stream C in the large bore 19 of the shank 15.

As shown in the curve A of Figure 4, the flow through the orifice A increases in accordance with an increase in pressure of fluid. The flow through the annular orifice B, as shown in the curve B, first increases with an increase in pressure and then decreases with a further increase in pressure, because the washer over-compensates or deflects at a faster rate after reaching an intermediate point of deflection. As shown in curve C, the flow through the orifice C can be held rather constant by adding the flow from orifice B to the flow from orifice A. As a result, the combined streams will have a relatively constant flow rate irrespective of pressure increases or fluctuations. Over-compensation of the elastic washer is thereby utilized to decrease the constantly increasing flow rate of a fixed orifice to produce a constant flow rate.

Since the shank 15 of the insert 14 is threaded in the port 13, the insert can be raised and lowered relative to the tapered passage 12 to thereby adjust the initial setting for the orifice B. Flow rate at a desired level can thereby be selected.

While the washer 21 is illustrated as having mere ring contact with the supporting insert member 14 to thereby obtain maximum deflecting conditions for the washer, it should be understood that the washer can be supported in any desired manner on the insert so long as its periphery can deflect to provide a variable annular orifice around the washer. Deflection of the aperture of the washer is immaterial as long as it does not decrease the capacity of the fixed orifice in the axial passage 18.

The above descriptions will show wherein the invention provides a flow device with a fixed orifice and a compensating orifice that combine to produce desired flow characteristics. The device is readily adjusted to vary the compensating orifice so that flow characteristics can be established at different levels.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A flow control device comprising a casing having a flow passage, an elastic member extending partially across said passage and coacting therewith to define a compensating annular orifice, means supporting said elastic member inwardly from the periphery thereof to permit the member to deflect under the influence of fluid flow through the passage and vary the size of the compensating orifice, said means having a fixed orifice therein, and passages joining said compensating and fixed orifices whereby fluid flow through the casing will be controled by two orifices at least one of which changes under the influence of changes in pressure to compensate for increased flow through the other orifice.

2. A flow control device comprising a housing having a passageway extending therethrough, a fixed orifice-defining member extending into said passageway, an elastic washer supported on said member to deflect under the influence of pressure for defining a compensating orifice between the washer and housing, and ports joining the fixed and compensating orifices downstream from the washer.

3. A flow control device comprising a casing having a tapered passage converging to an internally threaded port, an insert member projecting concentrically into said passage and having a hollow discharge shank threaded in said port, said insert member having a fixed orifice in the free end thereof directly communicating through the member with said hollow shank, an elastic washer supported around said insert member and extending unsupported therefrom into spaced relation with said tapered passage of the casing for coacting therewith to form a compensating orifice, said insert member being adjustable in said port to shift the washer along the tapered passage for varying the size of the compensating orifice, and ports in the insert member downstream from the compensating orifice to feed fluid therefrom to said shank for combining with fluid from the fixed orifice.

4. A flow control device comprising a casing defining a tapered passageway, an insert in said casing having a fixed orifice, an elastic washer around said insert and projecting freely therefrom to coact with the tapered passageway to define a compensating orifice, means for shifting the washer relative to the tapered passageway to vary the size of the compensating orifice, and merging passages downstream from the orifices to combine the fluid flow therefrom.

5. In a fluid flow control device, means defining a tapered flow passage, an elastic washer in said tapered flow passage and coacting therewith around its periphery to define an annular orifice, a fixed orifice in said passage surrounded by said washer, means for shifting said elastic washer along the tapered passage to vary the size of the annular orifice, and passages joining the flow from both orifices.

6. In a fluid flow control device, a casing having a tapered passage, an elastic washer in said casing spaced inwardly from the wall of the tapered passage and coacting therewith to define an annular orifice, a support for said washer inwardly from the periphery of the washer to permit flexing of the peripheral margin of the washer under the influence of fluid pressure to vary the annular orifice size, a fixed orifice receiving fluid from the aperture in the washer, merging passages extending downstream from said orifices to combine fluid flow through the orifices, and means for shifting said support to adjust the washer longitudinally of the tapered passage for setting the initial annular orifice size.

7. A device adapted to maintain a substantially constant rate of fluid flow irrespective of variations in pressures of the fluid which comprises a housing defining a flow passage, a fixed orifice member in said passage, an elastic ring around said member and projecting therefrom into spaced relation from the passage wall to coact therewith for defining a variable orifice, said ring being deformable under the influence of fluid pressure to decrease the size of the variable orifice as the fluid pressure increases, and means for merging the flow downstream from said orifices whereby variations in flow through the fixed orifice caused by pressure changes are offset by variations in flow through the variable orifice to produce a substantially constant merged flow rate.

ROBERT A. ROSENBLUM.